United States Patent
Huang et al.

(10) Patent No.: US 7,043,101 B1
(45) Date of Patent: May 9, 2006

(54) INTEGRATED OPTICAL PUMP MODULE

(75) Inventors: Yonglin Huang, Milpitas, CA (US); James Xu, Fremont, CA (US); Jian Lui, Sunnyvale, CA (US); Liren Du, San Jose, CA (US); Zheng Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 148 days.

(21) Appl. No.: 10/617,007

(22) Filed: Jul. 10, 2003

Related U.S. Application Data

(60) Provisional application No. 60/395,413, filed on Jul. 13, 2002.

(51) Int. Cl.
*G02B 6/00* (2006.01)

(52) U.S. Cl. .............................. 385/11; 385/15; 359/494
(58) Field of Classification Search .................. 385/11, 385/15, 31, 39, 47; 359/483, 494, 495
See application file for complete search history.

(56) References Cited

U.S. PATENT DOCUMENTS

| | | | | |
|---|---|---|---|---|
| 5,402,509 A | * | 3/1995 | Fukushima | 385/33 |
| 5,493,440 A | * | 2/1996 | Souda et al. | 359/341.1 |
| 6,282,025 B1 | | 8/2001 | Huang et al. | |
| 2002/0008901 A1 | * | 1/2002 | Kinoshita | 359/341.1 |
| 2002/0110328 A1 | * | 8/2002 | Bischel et al. | 385/49 |

OTHER PUBLICATIONS

*Optics*, Eugene Hecht, Figure 8.52, p. 306.

* cited by examiner

*Primary Examiner*—Sung Pak
(74) *Attorney, Agent, or Firm*—Workman Nydegger

(57) ABSTRACT

An optical pumping module for use in optical amplifiers in fiber-optic communication. The pump module integrates laser diodes and a polarization beam combiner (PBC). The laser diodes and PBC may be attached to a substrate. The laser diodes may be formed onto the substrate either monolithically or by attaching discrete components to the substrate. The PBC may include isolation to prevent reflections back into the laser diodes.

23 Claims, 4 Drawing Sheets

OPTICAL AXIS 0°

OPTICAL AXIS 45°

INTEGRATED OPTICAL PUMP MODULE

CROSS-REFERENCE TO RELATED APPLICATIONS

This application claims priority to and the benefit of U.S. Provisional Patent Application No. 60/395,413, filed Jul. 13, 2002, entitled Optical Pump Module; which is hereby incorporated by reference in its entirety.

BACKGROUND OF THE INVENTION

1. The Field of the Invention

The invention relates to the field of optical amplifiers. More specifically, the invention relates to systems and methods for combining optical pumping sources for use in optical amplifiers.

2. The Relevant Technology

In the field of data transmission, one method of efficiently transporting data is through the use of fiber-optics. Digital data is propagated through a fiber-optic cable using light emitting diodes or lasers. Light signals allow for extremely high transmission rates and very high bandwidth capabilities. Also, light signals are resistant to electro-magnetic interferences that would otherwise interfere with electrical signals. Light signals are more secure because they do not allow portions of the signal to escape from the fiber-optic cable as can occur with electronic signals in wire-based systems. Light signals also can be conducted over greater distances without the signal loss typically associated with electronic signals on wire-based systems.

While signal loss in a fiber-optic cable is less than that in wire-based systems, there is nonetheless some signal loss over the long transmission distances that light signals are transmitted. To compensate for the signal loss, optical amplifiers are used. Two common optical amplifiers are Raman amplifiers and Erbium Doped Fiber Amplifiers (EDFAs). Both of these amplifiers use characteristics of fiber-optic cables to amplify light signals.

The amplifier pumps light on the fiber-optic cable that is at a different frequency than the light signal that is to be amplified. Energy from the light that is pumped on to the fiber-optic cable is transferred to the light signal due to the characteristics of the fiber-optic cable. Optical amplifiers use optical pumps to generate the light that is pumped into the fiber-optic cable. Optical pumps, however, are expensive. Although the price of a low-power optical pump is relatively low, high-power optical pumps are substantially higher priced.

When light is pumped into an optical system, the gain provided by the pumped light is dependent on the polarization of the light that is pumped into the optical system. If the polarization of the pumped light source fluctuates, the gain may fluctuate. To achieve consistent gain, a pumping source that provides a beam that is the combination of two orthogonally polarized beams with equal power in each beam is desired.

For this reason, polarization beam combiners (PBCs) are widely used in Raman amplifiers and EDFAs. They provide a simple way to combine two optical pumping sources that have perpendicular polarization directions and equal power into a single beam. They also provide even polarization distribution in the combined pumping beam in two orthogonal directions to minimize gain that is dependent on the pumping beam's state of polarization.

Commercially available PBCs are made using two different approaches: micro-optics and fused fiber. A micro-optic PBC, shown in FIG. 1A, is a PBC associated with fiber coupling devices, such as collimators including an optical lens and a fiber pigtail. A PBC can be made in several different ways, including Wollaston, Nicol, Rochon, Glan-Thompson, or Glan-Taylor prisms, using thin-film coatings on Right Angle Prisms (RAPs), or a single piece of birefringent crystal. A PBC made of high quality birefringence material tends to have better optical performance, such as a higher polarization extinction ratio, than dielectric-coating-based devices, yielding lower combining loss and higher power handling. Typical birefringent materials include Calcite, YVO4, Rutile, $LiNbO_3$ and other single crystalline materials. A fused fiber PBC is simply a polarization maintaining (PM) fiber 2×2 fused fiber bi-conic coupler as shown in FIG. 1B, for example. A fused fiber PBC has a simple structure as well as low loss at the center wavelength and potential for low cost.

Both of these devices have limitations in practical applications. Multiple-wavelength pumping is often used to obtain wide and flat optical gains in the light signal bandwidth. Typically, two or three different wavelengths are used by the pump. These wavelengths fall about 20 nm apart and can cover a complete light signal bandwidth of at least 60 nm. To serve this wide bandwidth requirement, devices used for the pumping module should have flat performance response over the wavelength range. However, fused fiber devices show a 0.4 dB combining loss variance over a 60 nm wavelength bandwidth. Furthermore, it can be difficult to get equal combining efficiency for each input beam.

Another concern is controlling optical back reflections into the pumps. Most Raman pumps include multiple pump lasers. It is necessary to control the optical back reflection in order to stabilize the output of each laser and protect these lasers from being damaged. One common way to reduce back reflection is to employ optical isolators. The isolators are typically either in-line isolators, which can be fiber spliced into the optical path, or free space isolators used inside the pump laser module.

Many commercially available pump laser modules typically use fiber Bragg gratings (FBGs) to stabilize the pumping wavelengths. The FBGs are configured to reflect different wavelengths of light at different points in the optical path to compensate for the different speeds at which different frequencies of light travel in a fiber-optic cable. Free space isolators would block the reflections if placed in between the laser and the FBG, and thus cannot be used in such applications. Laser pumps thus require multiple external in-line isolators, which increases the cost and size of the pump.

Accordingly, it is desirable to integrate as many of the components of a pump as possible. This would serve to reduce component count and improve manufacturability, yielding improved optical performance in a smaller and less expensive module.

BRIEF SUMMARY OF THE INVENTION

In one aspect of the invention, two individual pump lasers are incorporated within an integrated pump module having high output optical power. The integration allows reduced component count and manufacturing time, a smaller size, and a lower cost. The module includes at least two active devices, such as laser diodes. Other active devices, such as photo diodes, may also be included within the same subassembly. The active devices may be fabricated on a single substrate monolithically or fabricated separately and then bonded to a common substrate.

In another aspect of the invention, the assembly includes a miniature optical beam combiner. The combiner redirects the beams of each laser into a single output beam. The combiner may also have an isolation function that enhances stability by preventing optical energy entering the module from falling on the active areas of the lasers.

In another aspect of the invention, active components may be integrated with passive components in the same subassembly. In comparison to discrete approaches, this provides a simple structure and uses fewer components, yielding higher optical performance, a smaller footprint, and lower cost.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to a combiner that can be used to combine/split light while providing optical isolation in a backward path. As previously discussed, it is difficult to use optical isolators in pump lasers because many lasers use Fiber Bragg Gratings (FBGs) to stabilize pumping wavelengths. The present invention provides high combining efficiency of two or more optical pumping sources that have substantially equal polarizations in orthogonal directions while providing optical isolation in a backward path.

Figure 1A:
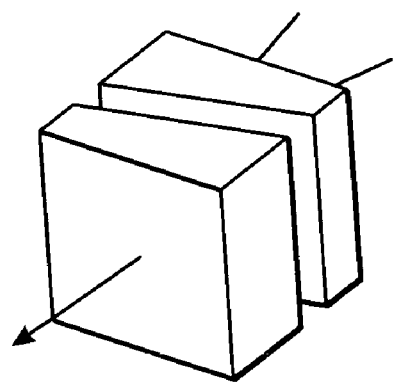
FIG. 1A illustrates a prior art micro-optic polarization beam combiner.
Figure 1B:
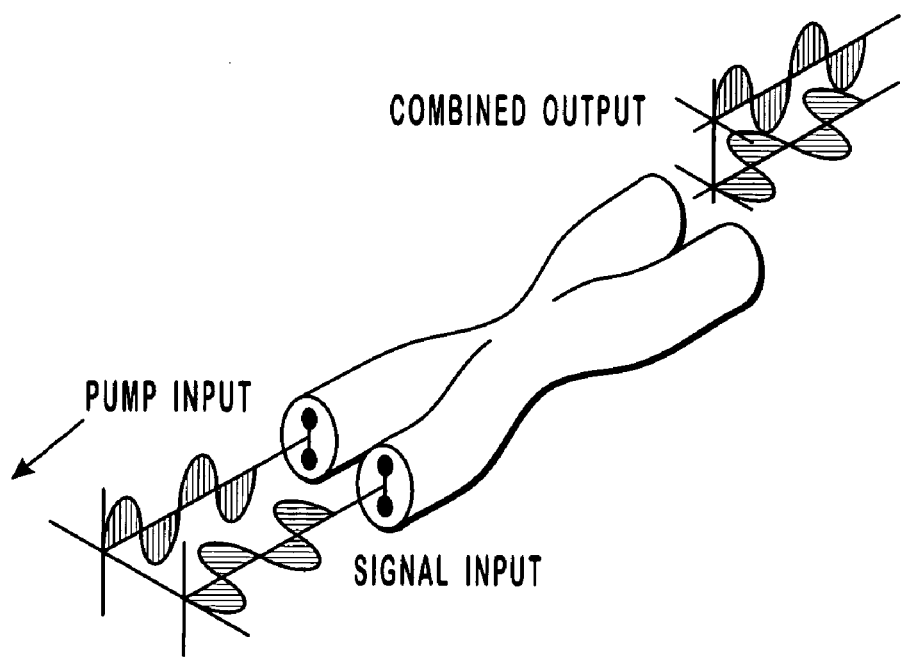
FIG. 1B illustrates a prior art fused fiber polarization beam combiner.
Figure 2A:
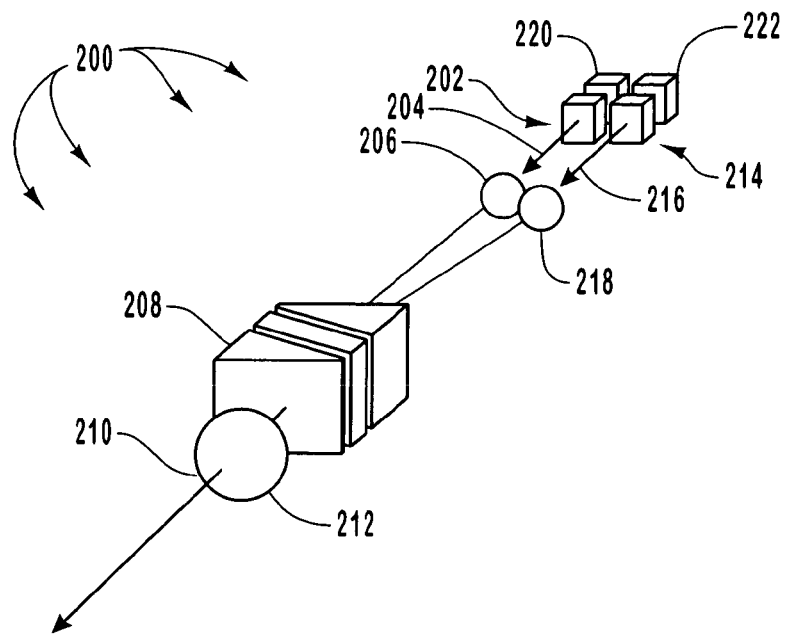
FIG. 2A illustrates an integrated optical pump module.

FIG. 2A shows a diagram of the active and passive components in the optical path of one embodiment of an optical pump module 200 embodying aspects of the invention. The active components are the laser diodes 202 and 214 and the photo diodes 220 and 222. The passive components are the optical lenses 206, 212 and 218 and the optical combiner 208.

The optical paths are as follows. Laser diode 202 produces a first pumping laser beam 204 in response to a drive current. The first pumping laser beam 204 is linearly polarized at some state of polarization (SOP). The SOP may be controlled using conventional techniques, such as through the manner of manufacture of the laser diode 202 or by using a wave plate. The first pumping laser beam 204 is collimated by a lens 206 and directed into a combiner 208. The combiner 208 refracts the first pumping laser beam 204 in a manner that will be described in more detail below, which is then focused and output to an output port 210 from the module 200 by a lens 212. The output port 210 that may be a single fiber pigtail or a standard fiber receptacle or plug such as small form factor, small form factor pluggable, or GBIC receptacles and/or plugs, and the like.

A laser diode 214 produces a second pumping laser beam 216. The second pumping laser beam 216 is a linearly polarized output beam polarized at an SOP that is perpendicular to the SOP of first pumping laser beam 204. The second pumping laser beam 216 is collimated by a lens 218 and directed into the combiner 208. The second pumping laser beam 216 is deflected by the combiner 208 into the same path as the first pumping laser beam. The second pumping laser beam 216 is focused into the output port 210 by the lens 212. The first and second pumping laser beams 204, 216 are thereby combined and output.

The devices shown in FIG. 2A may be included in the same optical subassembly, realizing space savings and improved performance. The subassembly may be a standard package, such as the various TO packages or an FCA package. Alternatively, the active and passive components may be realized in separate packages, and later appropriately assembled as part of an optical pump that may be used in an optical amplifier. With this approach, the components could be fiber spliced together or aligned in a free space arrangement.

Other approaches may be employed to combine laser beams into a single beam and other optical elements may be added to increase performance or functionality. For example, depending on the configuration of the laser diodes 202, 214, the lenses 206 and 218 may be realized as a single lens. Photo diodes such as the photodiodes 220 and 222 shown in FIGS. 2A and 2B, may also be included in the pump module 200 to monitor the output power of the laser diodes 202 and 214 in a conventional manner.

The combiner 208 may be a micro-optic PBC or it may be an isolating PBC (iPBC) in accordance with the present invention. An iPBC is a micro-optic device that has all the functionality of a conventional PBC in the forward optical path (laser-to-output) but has a large transmission loss in the backward optical path (output-to-laser). In other words, light traveling through the iPBC in the backward direction is diverted away from active optical devices. As will be explained in more detail below, the iPBC uses a Faraday rotator in one embodiment to change the SOP of light such that light traveling in the backward optical path has a large transmission loss. Considerations in selecting a combiner include laser wavelength and need for isolation. In some cases, a PBC may be preferable to an iPBC for shorter wavelengths due to the lowered efficiency caused by the Faraday rotator.

Figure 2B:
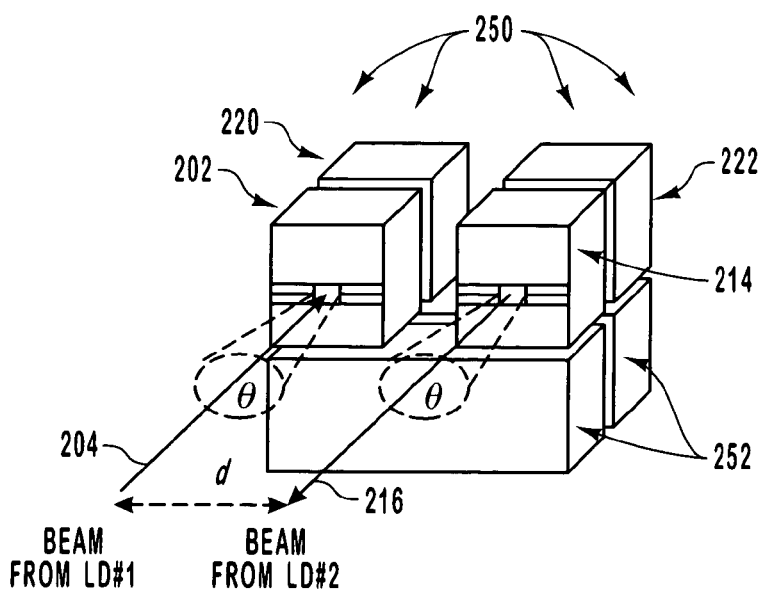
FIG. 2B illustrates active components in an optical pump.

An embodiment of the active components of the integrated pump module 200 is shown in FIG. 2B as an active part 250. Four active components are shown: two laser diodes 202 and 214 and two photo diodes 220 and 222. The exemplary active part 250 can be fabricated in many ways. One approach is to fabricate the four diodes 202, 214, 220 and 222 on the same substrate 252 monolithically. Because the operation of all the components depends on common physical principles, they can be designed and fabricated using the same material and processes. This offers one or more advantages, such as a simplified fabrication process, increased reliability from having fewer individual bonding joints, less cost by using fewer bonding and packing processes, and a small device footprint.

Another approach is to fabricate one or more diodes separately, and then bond them to the same substrate 252 or carrier. This offers the advantage of being able to take advantage of conventionally manufactured optical components available at low cost.

The configuration of the optical components should be chosen to match the requirements of the combiner 208. For example, the dimension d between the first and second pumping laser beams 204 and 216 and the emitting angles θ of the laser diodes 202 and 214 should be optimized to maximize the coupling efficiency to the combiner 208. In addition, some combiners may have polarization requirements. In the example in which an iPBC is used, the two light sources are linearly polarized in perpendicular directions. The polarization state of a light source can be determined in many ways. In the case of vertical-cavity surface-emitting laser (VCSEL) diodes, for example, methods to select single polarization operation can include use of an external reflector, suitable etching of the VCSEL's surface or its optical aperture, or the use of subwavelength transmission gratings. Polarization requirements of the combined output beam for a particular application may also affect the selection and configuration of combiner and light sources.

Referring to FIGS. 3A, 3B, 4A, 4B and 5, a combiner core 504 is constructed using a Polarization Beam Combiner (PBC) that includes, for example, Wollaston, Rochon, Glan-Thompson or Glan-Taylor prisms 302, 304, or even thin film cubes. These types of prisms are well known and widely used in optics, laser optics, and medical optics. All conventional PBCs are optically isotropic meaning that light travels the same in both directions.

The core may also include a Faraday rotator 402 that in one embodiment of the invention is a yttrium iron garnet (YIG) crystal. The Faraday rotator 402 may be latching magnetic material or non-latching magnetic material. For a non-latching material, an external magnet may be used to apply a magnetic filed while a latching material does not need an external magnetic field. In one example, when the bi-directional communications transceiver is intended to be used in an environment with stray magnetic fields, a non latching material design may be preferable as the external magnets will be better able to control the polarization changes of light traveling within the combiner core. This is true because the external magnets exert a stronger magnetic field on the light than the stray magnetic influences. If designs using a latching material were placed in an environment containing stray magnetic fields, the stray magnetic fields may cause a polarization shift in the light traveling in the combiner core.

Figure 3A:
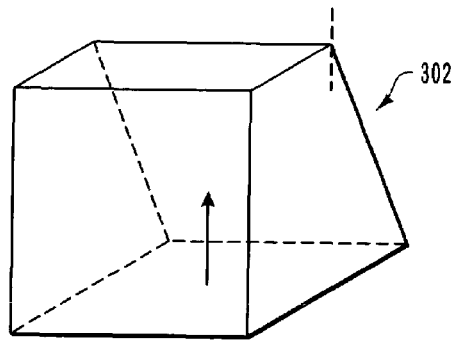
FIGS. 3A illustrates a perspective views of one embodiment of an optical birefringent wedge used in the construction of a combiner.
Figure 3B:
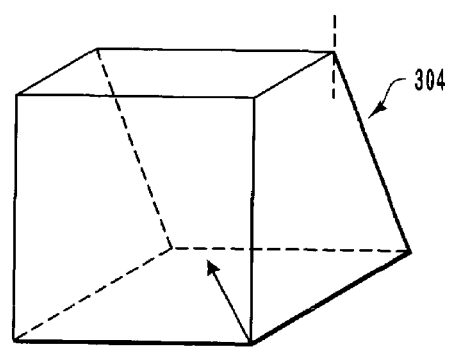
FIG. 3B illustrates a perspective views of one embodiment of an optical birefringent wedge used in the construction of a combiner.
Figure 4A:
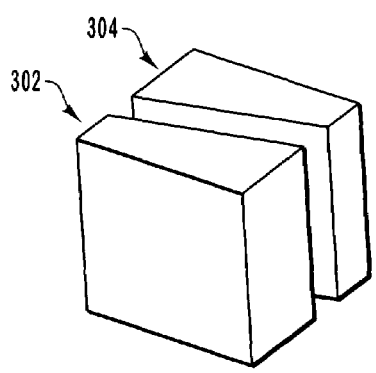
FIGS. 4A illustrates a perspective view of a Rochon prism.
Figure 4B:
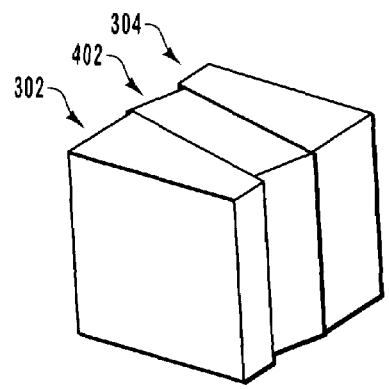
FIG. 4B illustrates a perspective view of an assembly of wedges and a Faraday rotator, sometimes referred to as the core of the combiner.

The combiner may use two optical birefringent wedges 302, 304. The wedge 302 and wedge 304 are shown in FIG. 3A and FIG. 3B, respectively. Putting these wedges 302, 304 side by side creates a prism similar to the Rochon prism shown in FIG. 4A. To cause this prism to be optically non-reciprocal (meaning that light travels differently in forward and backward directions), a Faraday rotator 402 is inserted in between the two wedges 302, 304 as shown in FIG. 4B.

Figure 5:
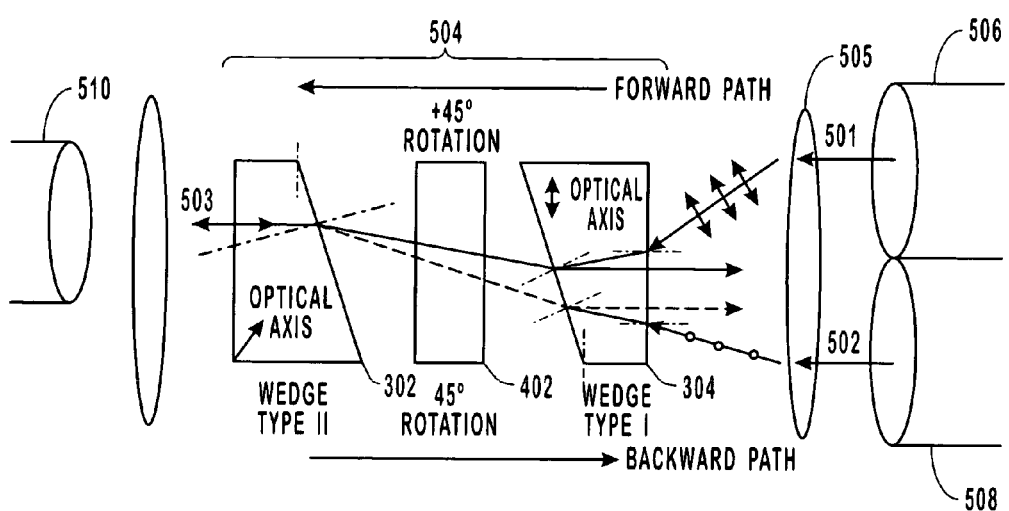
FIG. 5 illustrates an embodiment of the core, lenses, and optical fibers in a combiner.

The ray traces 501, 502 and 503 in the combiner 500 are shown in FIG. 5 for both forward and backward directions. A first linearly polarized beam is shown as a ray trace 501 from a first light source 506. The first linearly polarized beam from first light source 506 is polarized to be parallel to the optical axis of the first wedge 304. The first linearly polarized beam is focused by a lens 505 into the first wedge 304. The first wedge 304 in this example has an optical axis of 90°, but other configurations may work as well. The light source 506 may be any conventional source, such as an integrated laser diode, i.e laser diode 202, or the end of a fiber. When the light source is the end of a fiber, the fiber may be a polarization maintaining (PM) fiber. The fiber should have a high extinction ratio to obtain high beam combining efficiency. For example, an extinction ratio higher than 20 dB is preferable in some embodiments of the invention.

A second beam from the second light source 508, shown as ray trace 502, is also linearly polarized, but in a perpendicular direction to that of the first linearly polarized beam from the first light source (i.e., perpendicular to the optical axis of the first wedge 304). The second linearly polarized beam from the second light source 508 is focused by the lens 505 into the first wedge 304. As with the first light source 506, the second light source 508 may be a laser diode or PM fiber. If a PM fiber is used for the second light source 508, the PM fiber should be as perpendicular to the PM fiber used as the first light source 506 as possible such that the SOP of the first beam is perpendicular to the SOP of the second beam. In other words, the optical slow (fast) axes of the PM fibers should be perpendicular to each other. If the PM fibers are not perpendicular, power may be lost. This loss may be expressed by the equation:

$$\text{Loss} = -10 \log_{10}(\cos^2 \beta) \quad (1)$$

where $\beta$ is the amount of misalignment from perpendicular. Notably, this equation also holds true for loss for whatever light source is used. The light emitted by the sources should be polarized such that they are as close to perpendicular as possible with respect to each other.

The first and second light sources 506 and 508 are configured such that the two linearly polarized beams come to the first wedge 304 with an angle γ:

$$\gamma = 2 \cdot \arcsin[(n_o - n_e) \cdot \tan \theta] \quad (2)$$

(where θ is the wedge angle, and $n_o$, $n_e$ are the refractive indices for the ordinary beam and the extraordinary beam in the two birefringent wedges 302 and 304). After exiting the first wedge 304, the beams pass through a Faraday rotator 402. The exemplary Faraday rotator 402 shown in FIG. 5 has a rotation angle of 45° in the forward direction. Other rotators may be used in other configurations. The beams are refracted by the second optical wedge 302 into the same path, shown as ray trace 503. The beams are then focused into an output fiber 510 by a lens 512.

Light entering the combiner, which is an iPBC in this embodiment, from the output fiber 510 takes a different path through the combiner core 504. Depending on its polarization, light traveling in the backward path may take one of two different paths, but will exit the first wedge 304 in a direction perpendicular to the face of the wedge 304, as shown. The backward paths do not pass through the ray traces 501 or 502. Light can be prevented from returning to the two light sources 506 and 508 by a suitable optical configuration. Thus, any optical reflections along the output fiber 510 are isolated from the two laser diodes 202 and 214, protecting them and stabilizing their output power.

The foregoing example exhibits one embodiment of the invention in which two linearly polarized beams are combined to form a pumping beam. The pumping beam preferably has substantially equal polarizations in two orthogonal directions.

Generally, the physical construction of a combiner such as the one described above is accomplished by attaching discrete optical components onto a substrate material such as glass or polysilicon. The attachment can be accomplished by using epoxy or some other type of glue.

A device constructed according to the foregoing principles may be used to improve the pumping efficiency of EDFAs, Raman amplifiers, and the like. It may also be used for other applications such as polarization division multiplexing. Due to its performance, compact size, and integrated functionality, it allows the realization of compact, high-performance optical pump modules at less cost.

Multiple combiners can be utilized to pump with more than one wavelength of light. Multiple wavelength pumping is useful to obtain wide and flat optical gains in the signal band.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pump module for optical amplification of a light signal on a fiber-optic cable in a fiber-optic network, the pump module comprising:
    an active component part comprising at least a first laser diode and a second laser diode disposed on a substrate, wherein the first laser diode outputs a first pumping beam and the second laser diode outputs a second pumping beam; and
    a combiner disposed on the substrate and optically coupled to the active component part, wherein the combiner combines the first pumping beam and the second pumping beam into an output beam and wherein the combiner isolates the first laser diode and the second laser diode from back reflections, the combiner further comprising:
        a first wedge;
        a Faraday rotator optically coupled to the first wedge, the Faraday rotator comprising one of a: latching magnetic material; and, a non-latching magnetic material; and
        a second wedge optically coupled to the Faraday rotator.

2. The pump module set forth in claim 1, the active part being monolithically formed on the substrate.

3. The pump module set forth in claim 1, the active part comprising discrete laser diodes bonded to the substrate.

4. The pump module set forth in claim 3, the active part being bonded with epoxy to the substrate.

5. The pump module set forth in claim 1, further comprising a first wave plate and a second wave plate, wherein the first wave plate linearly polarizes the first pumping beam and the second wave plate linearly polarizes the second pumping beam such that a state of polarization of the first pumping beam is substantially perpendicular to a state of polarization of the second pumping beam.

6. The pump module set forth in claim 1, wherein the first laser diode outputs a linearly polarized first pumping beam and wherein the second laser diode outputs a linearly polarized second pumping beam that is substantially perpendicular to the first pumping beam.

7. The pump module set forth in claim 1, wherein the active part is coupled to the combiner through free space.

8. The pump module set forth in claim 1, the active part coupled to the combiner through at least one fiber-optic pigtail.

9. The pump module set forth in claim 8, the first laser diode coupled to the combiner through a first polarization maintaining (PM) fiber and the second laser diode coupled to the combiner through a second PM fiber, the first PM fiber and the second PM fiber being arranged such that a slow optical axis of the first PM fiber is substantially perpendicular to a slow optical axis of the second PM fiber.

10. A pump module for optical amplification of a light signal on a fiber-optic cable in a fiber-optic network, the pump module comprising:
    an active component part comprising at least a first laser diode and a second laser diode disposed on a substrate, wherein the first laser diode outputs a first pumping beam and the second laser diode outputs a second pumping beam; and a combiner disposed on the substrate and optically coupled to the active component part, wherein the combiner combines the first pumping beam and the second pumping beam into an output beam and wherein the combiner isolates the first laser diode and the second laser diode from back reflections, the combiner further comprising:
a first wedge;
a Faraday rotator optically coupled to the first wedge, the Faraday rotator comprising one of a: latching magnetic material; and, a non-latching magnetic material; and
a second wedge optically coupled to the Faraday rotator,
wherein the first and second wedges are one or more of Wollaston, Rochon, Glan-Thomson and Glan-Taylor prisms.

11. A pump module for optical amplification of a light signal on a fiber-optic cable in a fiber-optic network, the pump module comprising:
an active component part comprising at least a first laser diode and a second laser diode disposed on a substrate, wherein the first laser diode outputs a first pumping beam and the second laser diode outputs a second pumping beam; and
a combiner disposed on the substrate and optically coupled to the active component part, wherein the combiner combines the first pumping beam and the second pumping beam into an output beam and wherein the combiner isolates the first laser diode and the second laser diode from back reflections, the combiner further comprising:
a first wedge;
a Faraday rotator optically coupled to the first wedge, the Faraday rotator comprising one of a: latching magnetic material; and, a non-latching magnetic material; and
a second wedge optically coupled to the faraday rotator,
wherein the first and second wedges are thin film cubes.

12. The pump module set forth in claim 1, the active part further comprising, a plurality of photo diodes configured to monitor the output power of the plurality of laser diodes.

13. A combiner for use in combining a first pumping beam with a second pumping beam traveling in a forward direction, the combiner comprising:
a first birefringent wedge that receives a first pumping beam and a second pumping beam, wherein a state of polarization of the first pumping beam is substantially perpendicular to a state of polarization of the second pumping beam;
a rotator optically coupled to the first wedge that rotates the first pumping beam and the second pumping beam, wherein a return optical beam traveling in a backward direction through the combiner is rotated by the rotator such that a source of the first pumping beam and a source of the second beam are substantially isolated from the return optical beam, the rotator comprising one of a: latching magnetic material; and, a non-latching magnetic material; and a second birefringent wedge optically coupled to the rotator that combines the first pumping beam and the second pumping beam received from the rotator into an output beam.

14. A combiner as defined in claim 13, further comprising a first lens that focuses the first pumping beam and the second pumping beam into the first birefringent wedge.

15. A combiner as defined in claim 13, further comprising a second lens that focuses the output beam.

16. A combiner as defined in claim 13, further comprising:
a first polarization maintaining fiber that is connected with a source of the first pumping beam; and
a second polarization maintaining fiber that is connected with a source of the second pumping beam.

17. A combiner as defined in claim 16, wherein a slow axis of the first polarization maintaining fiber is substantially perpendicular to a slow axis of the second polarization maintaining fiber.

18. A combiner as defined in claim 13, further comprising a first laser diode that generates the first pumping beam and a second laser diode that generates the second pumping beam.

19. A pump module for pumping an optical amplifier with pumping beams having different wavelengths, the pump module comprising:
a plurality of combiners, wherein each combiner receives a first beam having a first state of polarization and a first wavelength and a second beam having the first wavelength and a second state of polarization that is substantially orthogonal to the first state of polarization, wherein each combiner further comprises:
a first birefringent wedge that receives the first beam and the second beam;
a second birefringent wedge that combines the first beam and the second beam into an output beam; and
a Faraday rotator between the first birefringent wedge and the second birefringent wedge, wherein each combiner isolates a source of the first beam and a source of the second beam from back reflections, the Faraday rotator comprising one of a: latching magnetic material; and, a non-latching magnetic material.

20. A pump module as defined in claim 19, wherein the Faraday rotator rotates the back reflections such the first wedge directs the back reflections away from source of the first beam and away from a source of the second beam.

21. A pump module as defined in claim 19, wherein each of the plurality of the combiners receives a different wavelength.

22. A pump module as defined in claim 19, further comprising a plurality of laser diodes that generates each first beam and each second beam.

23. A pump module as defined in claim 19, wherein each combiner generates an output beam used to amplify an optical signal.

* * * * *